No. 831,746. PATENTED SEPT. 25, 1906.
F. H. RUNDELL.
CULINARY UTENSIL.
APPLICATION FILED FEB. 27, 1904.
2 SHEETS—SHEET 1.
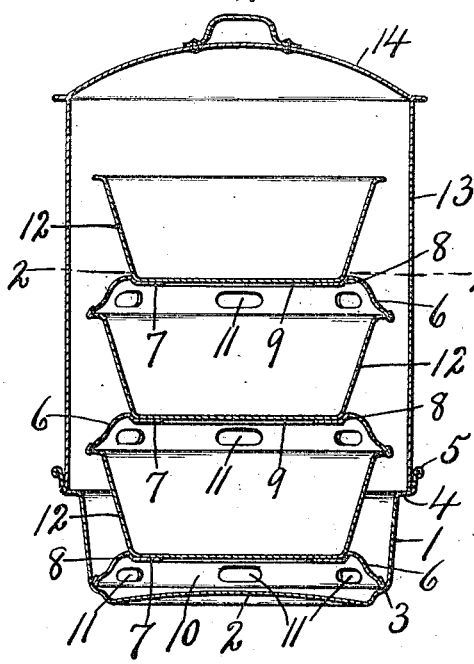
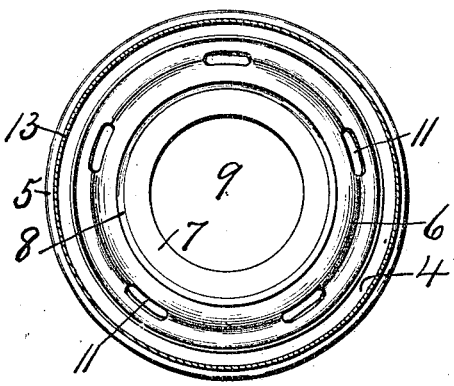
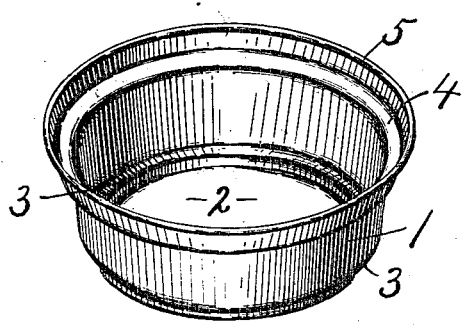
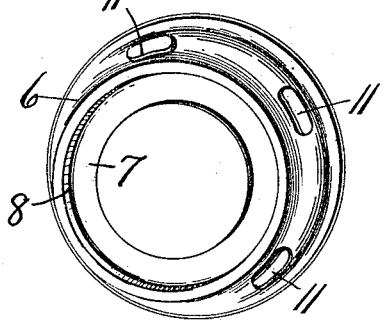

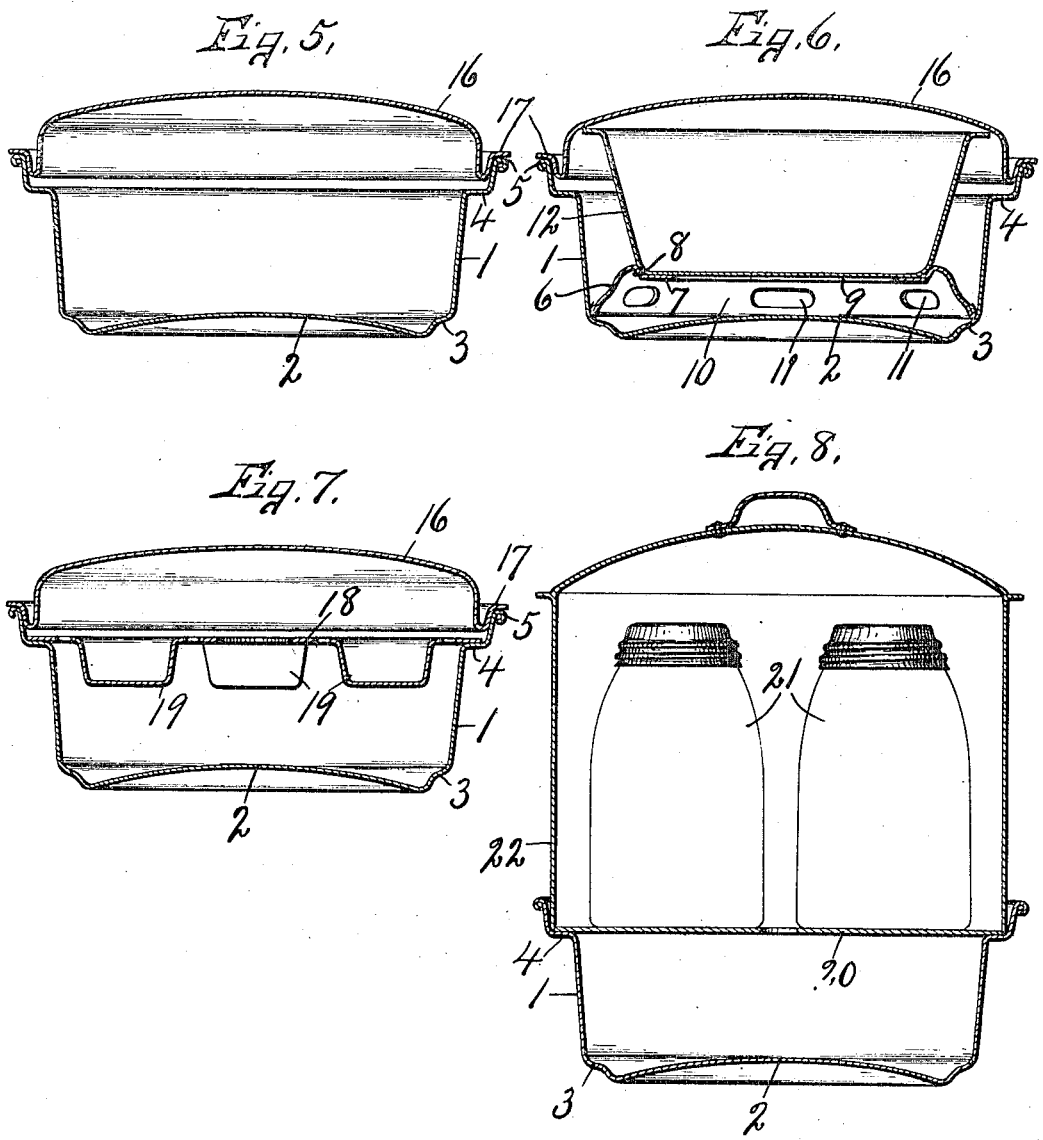

UNITED STATES PATENT OFFICE.

FRED H. RUNDELL, OF ANDOVER, NEW YORK.

CULINARY UTENSIL.

No. 831,746.  Specification of Letters Patent.  Patented Sept. 25, 1906.

Application filed February 27, 1904. Serial No. 195,693.

*To all whom it may concern:*

Be it known that I, FRED H. RUNDELL, of Andover, in the county of Allegany, in the State of New York, have invented new and useful Improvements in Culinary Utensils, of which the following, taken in connection with the accompanying drawings, is a full, clear, and exact description.

This invention relates to improvements in a culinary utensil which is capable of a variety of uses—such as a "cooker," "roaster," "egg-poacher"—and which may also be employed for cooking fruit in the cans.

The object is to provide a suitable receptacle which serves as the base for the different uses above mentioned and upon which different attachments or devices may be supported, according to the work to be done.

One of the specific uses of my invention is to receive and support a series of trays one over the other, so that different foods may be steamed, cooked, or otherwise simultaneously prepared in separate receptacles.

Another object is to provide suitable separating-supports for the superimposed trays with apertures through which the steam may readily pass and through which the attendant may "try" the different foods to ascertain whether they are properly cooked or seasoned without removing any of the trays or separating-supports.

Other objects will appear in the subsequent description.

In the drawings, Figure 1 is a transverse vertical sectional view of a supporting-base receptacle and a series of trays and separating-supports mounted therein one above the other and inclosed by a suitable jacket or cover. Fig. 2 is a horizontal sectional view taken on line 2 2, Fig. 1, just below the bottom of the upper tray. Figs. 3 and 4 are perspective views, respectively, of the supporting-base or main receptacle and one of the separator-supports for the superimposed tray. Fig. 5 is a transverse vertical sectional view of the supporting-base with a modified form of cover or lid, this device being adapted for use as a roaster. Fig. 6 is a transverse vertical sectional view through the base, showing one of my improved separator-supports and a single tray mounted thereon, the main device being covered by a lid, as seen in Fig. 5, and is adapted for use as a cooker. Fig. 7 is also a transverse vertical sectional view through the base or main receptacle, showing in connection therewith a transverse wall having a series of pockets, this device being adapted for poaching eggs. Fig. 8 is a sectional view through the main receptacle, showing a transverse wall supported thereon for supporting cans of fruit, a suitable hood or jacket covering the cans, whereby the fruit may be cooked in the cans.

Similar reference characters indicate corresponding parts in all the views.

In Figs. 1 and 3 and 5 to 8, inclusive, I have shown a receptacle 1, which constitutes the supporting-base or main receptacle for the various attachments which are used for different purposes in connection with the main receptacle. This receptacle consists of a cylindrical sheet-metal shell having a concavo-convex bottom 2, disposed with its convex side uppermost, the sides or inclosing wall being formed with lower and upper annular shoulders 3 and 4, both of which are disposed in a substantially horizontal plane, the annular shoulder 3 being located near but slightly above the bottom 2, and the annular shoulder 4 is located near the upper open end of the receptacle but slightly beneath its rim 5, so that the side or inclosing wall of the receptacle above the shoulder 4 is also disposed in a substantially upright position but of greater diameter than below said shoulder. The circular sides of this receptacle taper downwardly from the shoulder 4 to the shoulder 3 to permit a separator ring or plate 6 to be easily inserted into and removed from the interior of the receptacle when desired. This separator 6 consists of a shallow bell-shape annulus which is formed of thin sheet metal and inserted in the open upper end of the receptacle with its lower edge normally resting upon the annular shoulder 3, the diameter of said lower edge being substantially the same as the interior diameter of the lower end of the receptacle 1 just above the shoulder 3, while its upper end is of less diameter and has its central horizontal portion depressed for forming an annular horizontal shoulder 7 and an upright shoulder 8, the central portion of the top of this separator being cut away in the form of a circular opening for the purpose of lightening the weight of the separator and affording a passage for the steam.

When the separator is assembled in the manner described, its upper horizontal wall is separated from the bottom 2 to form a water and steam compartment or chamber 10 between the separator and bottom of the receptacle 1. The flaring sides of this separator are provided with a series of openings 11, through which the steam and water may readily pass from the chamber 10 to the interior of the receptacle 1 above the separator.

The construction of the receptacle 1 and separator 6 just described and their relative arrangement is clearly seen in Figs. 1 and 6, in which figures I have also shown a tray or basin 12, having its lower end of less diameter than its upper end and of substantially the same diameter as the interior diameter of the annular shoulder 8 within which the lower end of the basin 12 fits and rests upon the horizontal shoulder 7. The separator 6 is of considerable less depth than the receptacle 1, and therefore its upper wall is in a plane beneath the upper end of the receptacle, while the tray or basin 12 is of sufficient height so that when its lower end is resting on the separator 6 its upper end extends above the upper end of the receptacle 1, the object of this being to permit the attendant to readily engage the margin of the basin and lift the same from or insert it into operative position.

As seen in Fig. 1, the upper end of the basin 12 is of substantially the same diameter as the diameter of the lower end of the separator 6, and I therefore cap the basin 12 with one of these separators and have shown a series of basins 12 and separators 6 arranged one above the other in alternate relation, so that different materials may be cooked or steamed in the several basins or trays simultaneously, it being understood that the water is placed in the main receptacle 1, which rests upon the heater, and that the steam is free to pass from said receptacle upwardly through the openings 11 in the separators, and that the several trays or basins are entirely enveloped in the steam, a suitable jacket or cover 13 inclosing the superimposed basins or trays and having its lower end open and resting upon the annular flange or shoulder 4, while its upper end is closed by a suitable cap 14. The openings 11 not only serve to permit the steam to pass into and out of the basins or trays 12, but a fork or spoon or other utensil may be inserted through these openings to try or test the contents to ascertain whether they are done or properly seasoned without removing the trays or separators.

In Fig. 5 I have shown a receptacle 1 as provided with a removable cover or lid 16, which fits within the open upper end of the receptacle and is provided with an annular flange 17, resting upon the upper rim of said receptacle, this combination being used for roasting meats and for other similar purposes.

In Fig. 6 is shown a receptacle 1 with a single tray or basin 12 and a separator 6 similar to those seen in Fig. 1, the receptacle being provided with a lid 16 similar to that seen in Fig. 5, which also serves as a cover for the basin or tray 12, this combination being used for ordinary cooking purposes.

In Fig. 7 I have shown a receptacle 1 as provided with a removable tray 18, having a series of pockets 19, the edges of the tray being supported upon the upper annular flange or shoulder 4 and is adapted for use in poaching eggs, the receptacle 1 being provided with a lid 16 similar to that seen in Figs. 5 and 6, and the body of the tray between the pockets 19 is usually perforated to permit the steam to pass upwardly therethrough, so as to envelop the eggs or other material within the pockets.

In Fig. 8 is shown a receptacle 1, having a horizontal perforated tray 20, resting upon the annular flange or shoulder 4 for supporting fruit-containing cans 21, a suitable cover or jacket 22 similar to that seen in Fig. 1 being provided to inclose the cans. This latter combination is used for cooking the fruit in the cans.

It is apparent from the foregoing description that the essential features of my invention consist in the specific construction of the main receptacle 1 and separator 6 and also the particular arrangement of the trays or basins 12 and separators 6, as seen in Fig. 1, and although I have shown these features as combined in different ways it is evident that these elements may be combined for purposes other than those stated.

Having thus described my invention, what I claim, and desire to secure by Letters Patent, is—

A culinary utensil comprising a sheet-metal receptacle having the lower and upper portions of its sides pressed laterally forming lower and upper annular shoulders of unequal diameter, a plate having a downwardly-flaring marginal edge resting on the lower shoulder and its central portion depressed forming an annular shoulder surrounding and projecting above the depressed central portion, a second receptacle having its bottom loosely fitted within the annular shoulder of the plate and resting upon said depressed portion, an additional plate of the same dimensions and formed as the first-named plate covering the second receptacle, and a jacket inclosing the second receptacle and having its lower edge resting upon the upper annular shoulder of the first-named receptacle.

In witness whereof I have hereunto set my hand this 1st day of September, 1903.

FRED H. RUNDELL.

Witnesses:
SARA H. ALEXANDER,
W. J. CANNON.